United States Patent [19]

Okunishi et al.

[11] Patent Number: 4,850,760
[45] Date of Patent: Jul. 25, 1989

[54] METHOD OF FINISHING GEARS

[75] Inventors: Hiromu Okunishi; Ryuichi Tsukamoto, both of Saitama, Japan

[73] Assignee: Honda Giken Kogyo Kabushiki Kaisha, Tokyo, Japan

[21] Appl. No.: 266,281

[22] Filed: Oct. 26, 1988

Related U.S. Application Data

[63] Continuation of Ser. No. 33,844, Apr. 3, 1987, abandoned, which is a continuation of Ser. No. 718,313, Apr. 1, 1985, abandoned.

[30] Foreign Application Priority Data

Apr. 3, 1984 [JP] Japan .................................. 59-66231

[51] Int. Cl.[4] ............................................. B23F 19/06
[52] U.S. Cl. ................................ 409/37; 51/105 GG; 409/26; 409/49
[58] Field of Search ..................... 409/15, 8, 9, 12, 33, 409/34, 35, 37, 49, 56, 58; 51/105 GG, 287, 123 G, 105 HB, 26

[56] References Cited

U.S. PATENT DOCUMENTS

| 2,267,692 | 12/1941 | Dalzen | 409/37 |
|---|---|---|---|
| 2,696,762 | 12/1954 | Miller | 409/5 |
| 3,443,341 | 5/1969 | Honda et al. | 51/95 GH |
| 3,522,757 | 8/1970 | Lohrer | 409/31 |
| 4,084,481 | 4/1978 | Bossi | 409/37 |
| 4,173,920 | 11/1979 | Sigman, Jr. | 409/37 |
| 4,195,446 | 4/1980 | Angst | 51/105 GG |
| 4,203,258 | 5/1980 | Held | 409/5 |
| 4,212,572 | 7/1980 | Vu-Do | 409/37 |
| 4,253,050 | 2/1981 | Angst | 409/12 |
| 4,414,495 | 11/1983 | Sumi et al. | 51/105 HB |
| 4,587,766 | 5/1986 | Miyatake et al. | 51/95 GH |
| 4,663,721 | 5/1987 | Herslovici | 409/15 X |
| 4,708,544 | 11/1987 | Faulstich | 409/15 |

FOREIGN PATENT DOCUMENTS

| 76330 | 6/1981 | Japan | 409/49 |
|---|---|---|---|
| 755462 | 8/1980 | U.S.S.R. | 409/37 |
| 778964 | 11/1980 | U.S.S.R. | 409/37 |
| 758916 | 10/1956 | United Kingdom | 409/37 |
| 865847 | 4/1961 | United Kingdom | 409/37 |

Primary Examiner—William Briggs
Attorney, Agent, or Firm—Armstrong, Nikaido, Marmelstein, Kubovcik & Murray

[57] ABSTRACT

A workpiece gear to be finished is held in mesh with a gear finishing tool with substantially no backlash therebetween. The gear finishing tool is then driven in mesh with the workpiece gear, and the workpiece gear is rotated in synchronism with the driven movement of the gear finishing tool. Simultaneously, the gear finishing tool and the workpiece gear are moved reciprocally with respect to each other in the direction of a tooth trace for finishing gear surfaces of the workpiece gear. With this gear finishing method, gears can be finished highly accurately with no profile error and at an increased rate. An apparatus for carrying out the gear finishing method is of a simple construction.

6 Claims, 3 Drawing Sheets

METHOD OF FINISHING GEARS

This application is a continuation of application Ser. No. 033,844 filed Apr. 3, 1987, abandoned, which is a continuation of application Ser. No. 718,313 filed Apr. 1, 1985, abandoned.

BACKGROUND OF THE INVENTION

The present invention relates to a method of finishing a gear with a gear finishing tool having a gear-type or rack-type finishing teeth.

Japanese Patent Publication No. 58-54935 discloses a gear finishing method in which backlash or play is provided between tooth surfaces of a finishing tool and those of a workpiece gear to be finished by the tool. According to the disclosed gear finishing method, the gear is finished by driving the finishing tool and allowing the gear to follow the finishing tool, or vice versa, or by switching the directions of rotation of the finishing tool and the gear. However, this prior method cannot finish the gear to a high accuracy since the tooth surfaces of the finishing tool and the gear as they rotate in mesh with each other slip at irregular speeds and also since their teeth tend to hit each other due to the backlash. For gaining a cutting or grinding speed required to finish the gear efficiently, it is necessary to rotate the finishing tool and the gear at considerably high speeds while they are meshing with each other. High-speed rotation however disturbs desired dynamic balancing, resulting in a reduced finishing accuracy. In addition, any apparatus designed to carry out the above conventional method is structurally complex because of the required ability to drive the finishing tool and allow the workpiece to follow the finishing tool, or vice versa, or switch the directions of rotation of the finishing tool and the workpiece gear.

The present invention has been made in an attempt to solve the problems and deficiencies with the prior gear finishing method.

SUMMARY OF THE INVENTION

It is an object of the present invention to provide a method of finishing a gear to produce gear teeth of highly accurate profile without profile error, the method being able to be carried out by an apparatus having a simple construction.

According to the present invention, there is provided a method of finishing a workpiece gear, comprising the steps of holding the workpiece gear and a gear finishing tool in mesh with each other with substantially no backlash therebetween, driving said gear finishing tool in mesh with said workpiece gear, rotating said workpiece gear in synchronism with the driven movement of said gear finishing tool, and moving said gear finishing tool and said workpiece gear reciprocally with respect to each other in the direction of a tooth trace for finishing gear surfaces of said workpiece gear.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
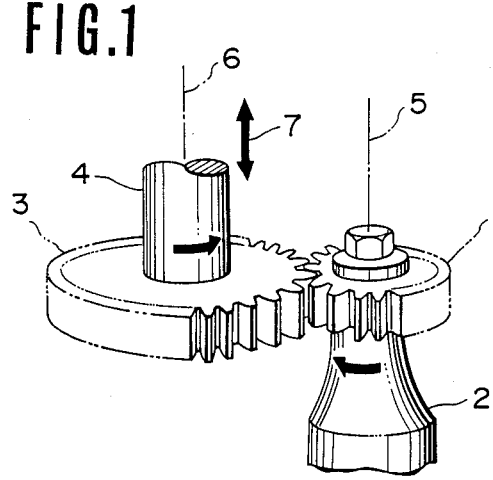
FIG. 1 is a fragmentary perspective view explanatory of a gear finishing method according to a first embodiment of the present invention.

FIG. 1 shows a gear finishing method according to a first embodiment of the present invention.

As shown in FIG. 1, a workpiece gear 1 which is roughly cut into a spur gear is attached to an attachment shaft 2 rotatable about its own axis 5. A gear finishing tool 3 in the form of a spur gear is mounted on a tool shaft 4 rotatable about its own axis 6 extending parallel to the axis 5 of the attachment shaft 2. Therefore, the gear 1 and the gear finishing tool 3 have parallel axes.

For carrying out the gear finishing method, the gear 1 is fastened to the attachment shaft 2, and brought into mesh with the gear finishing tool 3 without backlash or play therebetween. The attachment shaft 2 and the tool shaft 4 are synchronously rotated about their axis 5, 6 to rotate the gear 1 and the gear finishing tool 3 in mesh with each other. At the same time, the gear finishing tool 3 is reciprocally moved along the axis 6 in the directions of the arrow 7.

As the gear finishing tool 3 is reciprocated axially across the gear 1, the tooth surfaces of the gear 1 are finished by mutual sliding contact between the tooth surfaces of the gear 1 and the gear finishing tool 3 due their relative sliding movement in the direction of the tooth trace. The tooth surfaces of the gear 1 are finished over the entire teeth height due to intermeshing rotation of the gear 1 and the gear finishing tool 3. Since there is no backlash between the gear 1 and the gear finishing tool 3, and they rotate in synchronism with each other, their gear teeth do not hit one another, and are finished highly accurately with no profile error without being affected by the meshing rate and variations in the tooth surface curvature. According to the gear finishing method of the invention, gears can be finished at an increased rate.

The speed at which the gear finishing tool 3 and the gear 1 rotate in mesh with each other is not established for the purpose of gaining a cutting or grinding speed which is the case with the conventional finishing method. The gear 1 may therefore be finished at low speeds of rotation of the gear finishing tool 3 and the gear 1.

Since the gear finishing tool 3 and the gear 1 are driven in synchronism with each other, the gear finishing tool 3 can be brought smoothly into mesh with the gear 1 even when the gear finishing tool 3 is moved out of mesh with the gear 1. Therefore, the stroke of reciprocating movement of the gear finishing tool 3 can be selected irrespectively of the tooth width or thickness of the gear 1.

Figure 2:
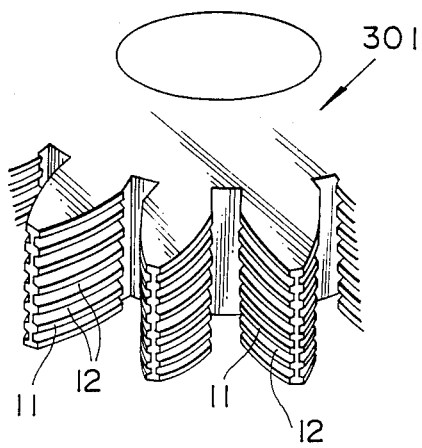
FIG. 2 is a fragmentary perspective view of a gear finishing tool which can be used in the gear finishing method of FIG. 1.
Figure 3:
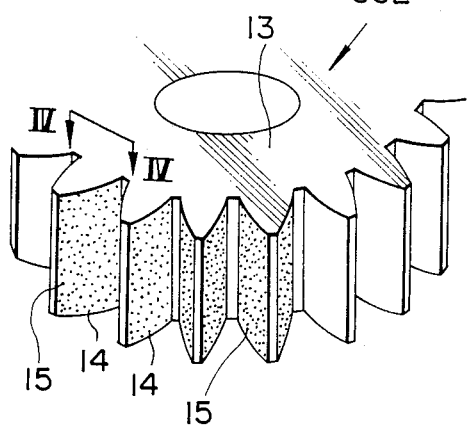
FIG. 3 is a fragmentary perspective view of the gear another gear finishing tool which can be used in the gear finishing method of FIG. 1.
Figure 4:
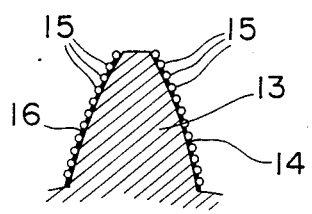
FIG. 4 is a cross-sectional view taken along line IV—IV of FIG. 3.

The gear finishing tool 3 may have different designs. Where the tooth surfaces of the gear 1 are relatively soft, a gear finishing tool 301 similar to a gear shaving cutter as shown in FIG. 2 may be employed which has a plurality of gashes or grooves 12 defined in spur-gear tooth surfaces 11 in the direction of the tooth height. Where the tooth surfaces of the gear 1 are relatively hard, as with quenched and hardened gears, a gear finishing tool 302 as illustrated in FIGS. 3 and 4 may be employed. The gear finishing tool 302 is in the form of a metallic spur-gear-shaped base 13 having tooth surfaces 14 on which a ultrahard abrasive grain such as of diamond on cubic boron nitride (CBN) is fixed by electro-deposition with a single layer (16). When the method of the invention is carried out using the gear finishing tool 301, the workpiece gear is finished by a gear shaving process. When the method is carried out using the gear finishing tool 302, the workpiece gear is finished by a gear grinding process.

Figure 5:
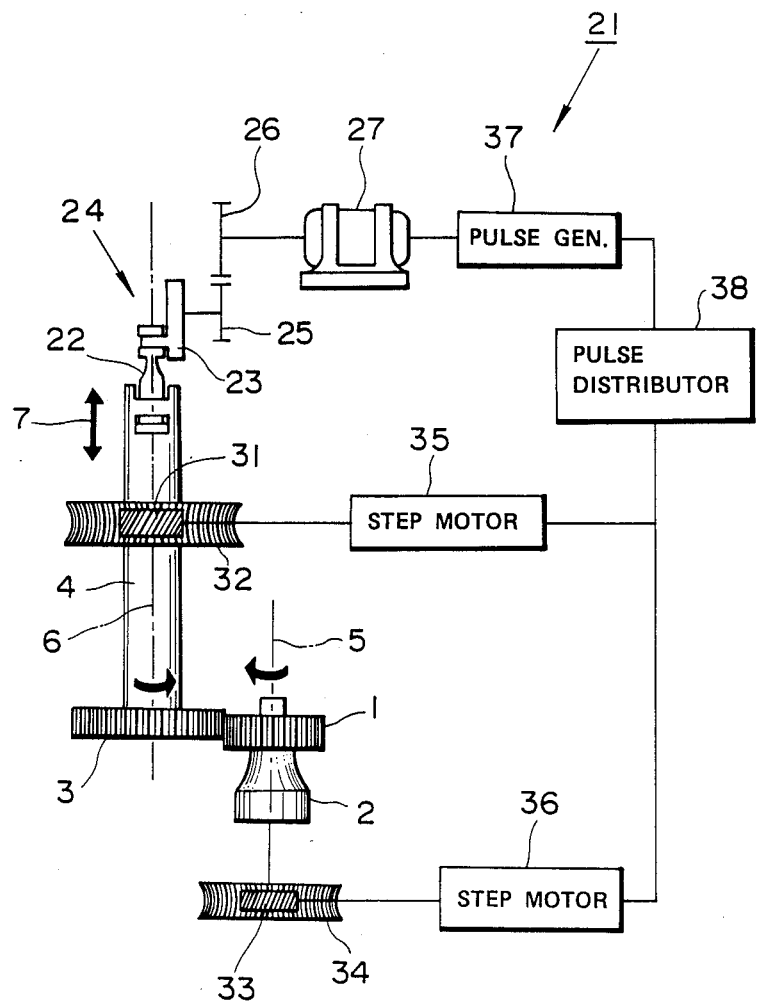
FIG. 5 is a schematic diagram of a finishing apparatus.

An apparatus for carrying out the method of the present invention is of a simple construction since the tool shaft axis 6 and the attachment shaft axis 5 extend parallel to each other and the gear finishing tool 3 is reciprocally moved along the axis 6 for finishing the workpiece gear 1. FIG. 5 schematically shows a gear finishing apparatus for carrying out the method of the invention. Identical parts in FIG. 5 are denoted by identical reference characters in FIG. 1. The gear finishing apparatus, generally designated 21, have the tool shaft axis 6 and the attachment axis 5 extending parallel to each other.

The tool shaft 4 is connected by a coupling 22 to a crank arm 23. The tool shaft 4, the coupling 22, and the crank arm 23 jointly constitute a reciprocating slider crank mechanism 24, which is driven by meshing gears 25, 26 and a motor 27 to move the tool shaft 4 reciprocally along the axis 6.

The tool shaft 4 supports thereon a worn wheel 32 meshing with a worm gear 31. The attachment shaft 2 supports thereon a worm wheel 34 meshing with a worm gear 33. The worm gears 31, 33 are rotated by step motors 35, 36, respectively. The motor 27 is coupled to a pulse generator 37 for generating pulses and applying them to a pulse distributor 38 such as a pulse rate multiplier. The pulse distributor 38 processes the pulse signal from the pulse generator 37 to feed synchronizing pulse signals to the step motors 35, 36 for thereby rotating the step motors 35, 36 in synchronism with each other.

The gear finishing apparatus 21 therefore operates to rotate the gear finishing tool 3 and the gear 1 in synchronism with each other and to move the gear finishing tool 3 reciprocally along the tool shaft axis 6 for finishing the gear 1.

Figure 6:
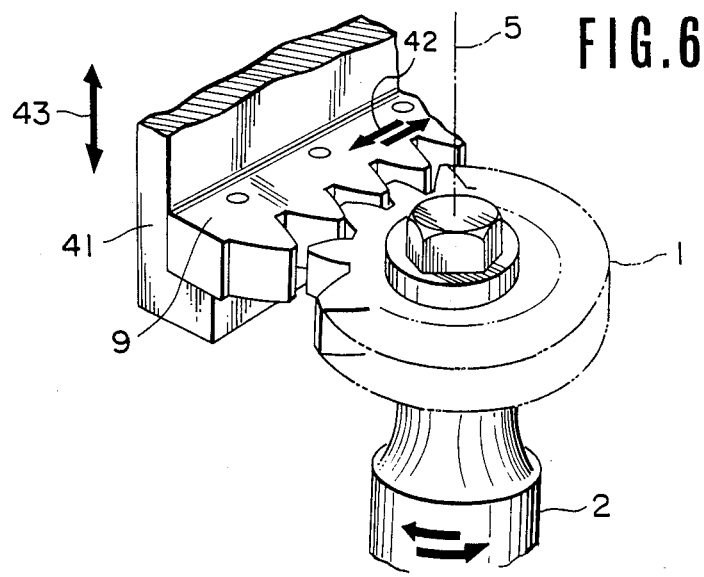
FIG. 6 is a fragmentary perspective view explanatory of a gear finishing method according to a second embodiment of the present invention.

A gear finishing method according to a second embodiment of the present invention will be described with reference to FIGS. 6 through 8.

A workpiece gear 1 in the form of a spur gear is mounted on an attachment shaft 2 rotatable about its own axis 5. A rack-type gear finishing tool 9 is fixed to a tool base 41 and extends in a direction normal to the axis 5 of the attachment shaft 2, i.e., the axis of the gear 1.

Figure 7:
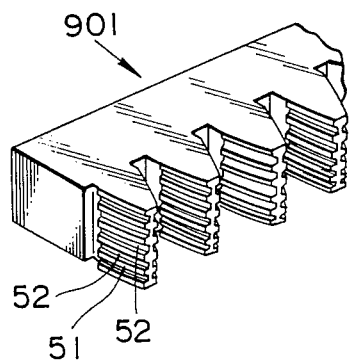
FIG. 7 is a fragmentary perspective view of a gear finishing tool which can be used in the gear finishing method of FIG. 6.
Figure 8:
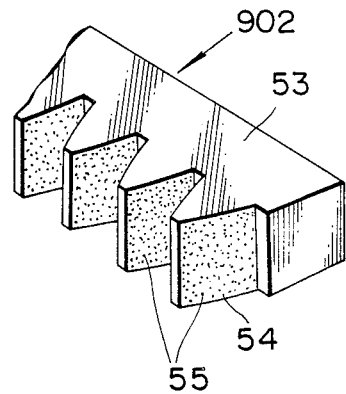
FIG. 8 is a fragmentary perspective view of another gear finishing tool which can be used in the gear finishing method of FIG. 6.

In operation, the gear 1 is fastened to the attachment shaft 2 and brought into mesh with the gear finishing tool 9. The tool base 41 is moved reciprocally in the directions of the arrow 42 normal to the axis 5 to move the gear finishing tool 9 in mesh with the gear 1. In synchronism with the reciprocating movement of the tool base 41, the attachment shaft 2 is reciprocally turned about the axis 5 to angularly move the gear 1. At the same time, the gear finishing tool 9 is moved reciprocally in the directions of the arrow 43 parallel to the axis 5. The gear 1 is therefore finished in substantially the same manner as that of the first embodiment.

Where the tooth surfaces of the gear 1 are relatively soft, a gear finishing tool 901 as shown in FIG. 7 may be employed which has a plurality of gashes or grooves 52 defined in tooth surfaces 51 in the direction of the tooth height. Where the tooth surfaces of the gear 1 are relatively hard, as with quenched and hardened gears, a gear finishing tool 902 as illustrated in FIG. 8 may be employed. The gear finishing tool 902 is composed of a metallic base 53 having tooth surfaces 54 each coated by electrodeposition with a single layer of ultrahard abrasive grain 55 such as of diamond or cubic boron nitride.

While in the illustrated embodiments only the gear finishing tool is reciprocally moved to finish the workpiece gear, only the workpiece gear may be reciprocally moved, or both the gear finishing tool and the workpiece gear may be reciprocally moved.

The gear finishing method of the present invention may be employed to other gears than the spur gear, such as helical gears for example.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A method for finishing the tooth surface of a workpiece gear, the steps comprising:
    providing a workpiece gear in the desired gear shape with unfinished gear teeth and a finishing tool having a plurality of teeth, each tooth of said finishing tool having constant thickness in the direction of tooth trace;
    mounting said workpiece gear and said finishing tool in fixed positions on parallel shafts with the axes of said shafts and said gear parallel to each other and having an unfinished gear tooth of said workpiece gear and a tooth of said tool in mesh alignment with each other with substantially no backlash between said unfinished tooth and said tool tooth, each shaft of said parallel shafts being driven by a step motor;
    with said unfinished gear tooth and said tool tooth in mesh alignment, reciprocally moving at least one of said workpiece gear and said finishing tool with respect to each other in the direction of tool trace of the tooth and the workpiece by driving means including an electric motor with the surface of the meshing gear tooth and the surface of the meshing tool tooth in contact with each other during both back and forth motions of said reciprocal movement and, while so reciprocally moving said workpiece gear and said finishing tool, generating pulse signals in accordance with said reciprocal movement with a pulse generator coupled to said electric motor;

processing said pulse signals through a pulse distributor to provide said step motor of each said shaft with synchronized pulse signals;

with said generating pulse signals and while so reciprocally moving said workpiece gear and said finishing tool, positively driving said workpiece gear and positively driving said tool in synchronism with each other with said step motor with said synchronized pulse signals provided to said step motor of each said shaft by said pulse distrbutor;

wherein the tooth surfaces of said workpiece gear are finished by mutual sliding contact between the tooth surfaces of said workpiece gear and said tool in the tooth trace direction.

2. A method according to claim 1, wherein the tooth surface of said each tooth of said finishing tool has a plurality of grooves defined therein and extending in the direction of the tooth height.

3. A method according to claim 2, wherein said grooves defined in the surface of said each tooth of said finishing tool form a plurality of ridges each ridge having a pair of cutting edges for cutting the meshing surface of the workpiece gear on the back and forth motions of said reciprocal movement.

4. A method according to claim 1, wherein the tooth surface of each said tooth of said finishing tool is coated with abrasive grain.

5. A method for finishing the tooth surface of a workpiece gear, the steps comprising:

providing a workpiece gear in the desired gear shape with unfinished gear teeth and a toothed wheel gear tooth finishing tool, each tooth of said toothed wheel finishing tool having constant thickness in the direction of tooth trace;

mounting said workpiece gear and said gear tooth finishing tool in fixed positions on parallel shafts with the axes of said shafts and said gear and said toothed wheel finishing tool parallel to each other and having an unfinished gear tooth of said workpiece gear and a tooth of said tool in mesh alignment with each other with substantially no backlash between said unfinished tooth and said tool tooth, each shaft of said parallel shafts being driven by a step motor;

with said unfinished gear tooth and said tool tooth in mesh alignment, reciprocally moving at least one of said workpiece gear and said finishing tool with respect to each other in the direction of tool trace of the tooth and the workpiece by driving means including an electric motor with said gear tooth and said tool tooth in contact with each other during both back and forth motions of said reciprocal movement and, while so reciprocally moving said workpiece gear and said finishing tool, generating pulse signals in accordance with said reciprocal movement with a pulse generator coupled to said electric motor;

processing said pulse signals through a pulse distributor to provide said step motor of each said shaft with synchronized pulse signals;

with said generating pulse signals and while so reciprocally moving said workpiece gear and said finishing tool, positively driving said workpiece gear and positively driving said tool in synchronism with each other with said step motor with said synchronized pulse signals provided to said step motor of each said shaft by said pulse distributor;

wherein the tooth surfaces of said workpiece gear are finished by mutual sliding contact between the tooth surfaces of said workpiece gear and said tool in the tooth trace direction.

6. A method for finishing the tooth surface of a workpiece gear, the steps comprising:

providing a workpiece gear in the desired gear shape with unfinished gear teeth and a gear tooth finishing tool rack having a plurality of axially aligned teeth, each tooth of said finishing tool rack having constant thickness in the direction of tooth trace;

mounting said workpiece gear and said gear tooth finishing tool in fixed positions on parallel supports with the axes of said supports and said workpiece gear parallel to each other and having an unfinished gear tooth of said workpiece gear and a tooth of said finishing tool rack in mesh alignment with each other with substantially no backlash between said unfinished tooth and said tool tooth, each support of said parallel supports being driving by a step motor;

with said unfinished gear tooth and said tool tooth in mesh alignment, reciprocally moving at least one of said workpiece gear and said finishing tool with respect to each other in the direction of tool trace of the tooth and the workpiece by driving means including an electric motor with said gear tooth and said tool tooth in contact with each other during both back and forth motions of said reciprocal movement and, while so reciprocally moving said workpiece gear and said finishing tool rack, generating pulse signals in accordance with said reciprocal movement with a pulse generator coupled to said electric motor;

processing said pulse signals through a pulse distributor to provide said step motor of each said support with synchronized pulse signals;

with said generating pulse signals and while so reciprocally moving said workpiece gear and said finishing tool rack, positively driving said workpiece gear and positively driving said tool rack in synchronism with each other with said step motor with said synchronized pulse signals provided to said step motor of each said support by said pulse distributor;

wherein the tooth surfaces of said workpiece gear are finished by mutual sliding contact between the tooth surfaces of said workpiece gear and said tool in the tooth trace direction.

* * * * *